United States Patent

[11] 3,593,117

[72] Inventor Gerhard Koch
 Jena, Germany
[21] Appl. No. 806,788
[22] Filed Mar. 12, 1969
[45] Patented July 13, 1971
[73] Assignee VEB Carl Zeiss Jena
 Jena, Germany

[54] SAMPLE CELLS FOR ELECTRON-RESONANCE TESTS
 1 Claim, 1 Drawing Fig.
[52] U.S. Cl. .................................................. 324/0.5, 23/292
[51] Int. Cl. .................................................. G01n 27/78

[50] Field of Search .................................... 324/0.5; 174/92, 155; 73/425.4; 356/246; 220/4; 206/1

[56] References Cited
UNITED STATES PATENTS
3,080,520 4/1963 O'Reilly .................... 324/0.5
3,122,703 2/1964 Rempel ..................... 324/0.5

*Primary Examiner*—Michael J. Lynch

ABSTRACT: A sample cell for the reception of highly polar samples to be tested for EPR comprises two parts which are so fitted together as to form a tube of rectangular cross section inside and annular cross section outside. The cell is easy to disassemble for cleaning.

PATENTED JUL 13 1971 3,593,117
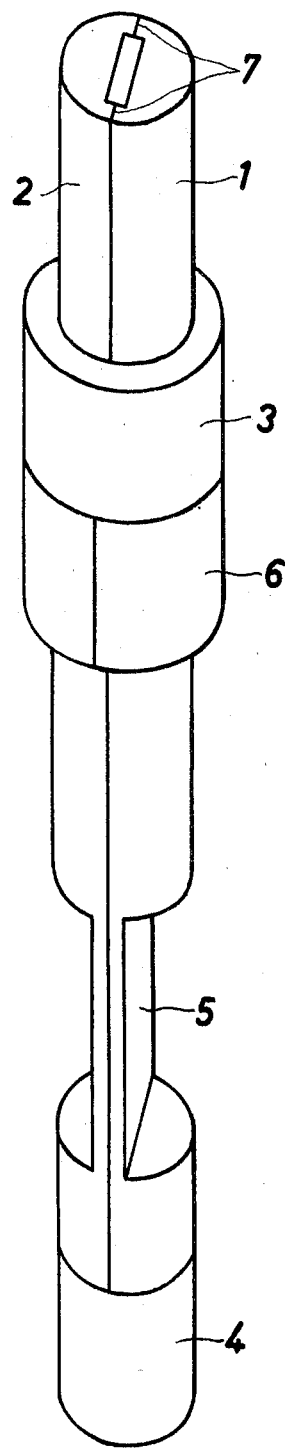
INVENTOR
Gerhard Koch

SAMPLE CELLS FOR ELECTRON-RESONANCE TESTS

This invention relates to cells for the reception of highly polar samples that are to be submitted to electron-resonance tests.

In spectroscopy using the effect of EPR, the intensity of the high frequency field is generally concentrated in the sample by means of cavity resonator, the sample being placed in this resonator at a position where the magnetic intensity and the electric high frequency field intensity are respectively at a maximum and a minimum, so that the dielectric losses are kept low. The thorough exploitation of the sensitivity of a spectrometer is contingent on the greatest possible quantity of sample that may be introduced into the cavity resonator. This quantity depends on the character of the sample concerned. The greatest possible thickness of, for example, a stratified sample in aqueous solution is only 0.4 millimeter. This means, however, that the cell for such liquid samples must fulfill definite conditions, such as for example low tolerance rate in the optimum values of its dimensions, avoidance of great dielectric losses, possibility of adjusting the sample in the cavity resonator with regard to minimum of electric high frequency field intensity, and possibility to use the cell for samples of various kinds. The latter condition requires that the cell be easy to clean.

Known cells for samples to be submitted to electron-resonance tests comprise a tube which is of circular internal and external cross section along its entire length or whose part inside the cavity resonator is reduced to approximately rectangular cross section. These known cells do not sufficiently satisfy the said conditions.

The present invention aims at obviating this disadvantage by providing a cell of the foregoing kind in which the liquid sample is in the form most advantageous for measuring and by means of which the sample can be adjusted in a simple manner in the cavity resonator, and which avoids great dielectric losses and can be used for the measures of a great variety of samples.

The invention accordingly consists in a sample cell of dielectric material for the reception of highly polar samples to be tested for EPR, characterized in that it is composed of two identical parts which are exactly symmetrical with regard to a longitudinal plane and make up into a tube closed at one end, this tube being of rectangular cross section inside and being of circular cross section outside except at a region which for the purpose of reducing dielectric losses is so milled parallel to the symmetry plane of the tube as to have an exterior cross section substantially in the form of a rectangle.

The two parts of the cell may be held together by two rings.

Advantageously, the exterior cross section is such that the symmetry plane of the cell can be centered relatively to the minimum of the electric high frequency field in a cavity resonator.

In order that the invention may be more readily understood, reference is made to the accompanying drawing which illustrates diagrammatically and by way of example one embodiment of the cell of the invention.

In the drawing, the cell comprises two component parts 1 and 2 which are equal to one another and held together by rings 3 and 4. A region 5 of the cell is milled to correspond to the interior dimensions of the cavity resonator, so that dielectric losses are reduced. The exterior surface of the cell is cut to fit accurately into the aperture of the cavity resonator, so that the cell is symmetrical with regard to the minimum of the electric high frequency field. The best possible position is determined by rotating the cell, which is subsequently fixed. A collar 6 holds the cell in position in the cavity. The rings 3 and 4 can be slipped off, so that the cell may be taken apart for cleaning. Before reassemblage, a thin layer of sealing material, depending on the solvent, is applied to the cut faces 7 of the parts 1 and 2. The sample liquid is introduced by injection through the open end of the cell.

I claim:

1. A sample cell for the reception of highly polar liquid samples to be tested by electron precession resonance upon insertion into a microwave cavity resonator, comprising:

a pair of elongated, identical parts of dielectric material each having a semicircular transverse cross section for substantially its entire length;

each of said parts also having a rectangular recess milled in the flat, surface thereof, said recess extending longitudinally from one end of said parts and having a length less than the length of said parts;

each of said parts further having a reduced, substantially rectangular transverse cross section along the predetermined portion of its length which is inserted into the microwave cavity resonator;

said parts being mated symmetrically with their flat surfaces in adjoining relationship along their entire length to thereby form an internal sample cavity having a rectangular cross section, said cavity being open at said one end of said parts and closed at the other end of said parts;

a pair of spaced rings each encircling an end portion of said mated parts for holding said parts in their adjoining relationship; whereby the circular portion of the cell centers it in the cavity resonator and the portion of the cell having a rectangular cross section forms reduced flat surfaces which are parallel to the adjoining flat surfaces of said parts, and sealing material between the adjoining surfaces of said mated parts to maintain samples within said sample cavity.